United States Patent [19]
Rhodes

[11] Patent Number: 4,947,978
[45] Date of Patent: Aug. 14, 1990

[54] CONVEYOR SYSTEM AND METHOD OF CONVEYING

[76] Inventor: Arthur B. Rhodes, 3347 Camp Ground Rd., Louisville, Ky. 40211

[21] Appl. No.: 345,364

[22] Filed: May 1, 1989

[51] Int. Cl.$^5$ .............................................. B65G 17/00
[52] U.S. Cl. .................................. 198/341; 198/465.2; 198/465.1
[58] Field of Search ............ 198/341, 340, 343, 465.2, 198/503, 731, 803.01, 465.1; 104/172.2, 172.3, 250, 252, 88; 186/46, 49

[56] References Cited

U.S. PATENT DOCUMENTS

| | | | |
|---|---|---|---|
| 3,021,967 | 2/1962 | Patzold et al. | 198/503 X |
| 3,527,087 | 9/1970 | Converse, III et al. | 198/341 X |
| 3,805,942 | 4/1974 | Auernhammer | 198/341 |
| 3,824,930 | 7/1974 | Biessener | 104/172.2 |
| 3,854,889 | 12/1974 | Lemelson | 198/341 X |
| 3,949,859 | 4/1976 | Nussbaumer et al. | 104/172.2 X |
| 4,013,015 | 3/1977 | Fromme et al. | 104/172.2 |
| 4,088,220 | 5/1978 | Jacksch et al. | 198/343 X |
| 4,572,080 | 2/1986 | Williams et al. | 104/252 |
| 4,702,174 | 10/1987 | Tredwell et al. | 104/172.2 |
| 4,793,261 | 12/1988 | Schwaemmle | 198/803.01 X |

Primary Examiner—David A. Bucci
Assistant Examiner—James R. Bidwell
Attorney, Agent, or Firm—Charles G. Lamb

[57] ABSTRACT

A conveying system includes a movable conveyor track with a plurality of load carrying units movable with the conveyor track for conveying workpieces along the path defined by the conveyor track. Each of the load carrying units includes a device to selectively couple and uncouple the load carrying units from the conveyor track so that the load carrying units can selectively and individually be coupled to the conveyor track for movement therewith. In one embodiment, the system includes accumulation areas at preselected locations along with counting and calculating systems to determine and control the number of load carrying units between accumulation areas. In a second embodiment, means are provided to release load carrying units at preselected time intervals from each accumulation area.

7 Claims, 4 Drawing Sheets

CONVEYOR SYSTEM AND METHOD OF CONVEYING

BACKGROUND OF THE INVENTION

The present invention relates to conveyor systems, and more particularly, a conveyor system wherein the movement of load carrying units moved by a continuously moving conveyor are individually controlled.

Conveying systems are typically used in manufacturing facilities to move workpieces through various workstations located along the conveying path.

Conveyor systems known to me include conveyors which move at a constant speed and include load carrying units which can be coupled for movement therewith between workstations and uncoupled from the conveyor so that they will be stationary at the workstations while work is done on a workpiece carried by the load carrying units. These conveyor systems work well wherein all of the workpieces are the same or otherwise require the same amount of work time at each workstation along the conveyor path.

However, in many manufacturing operations, a mix of workpieces requiring different amounts of work time at the various workstations are moved on the same conveyor through the various workstations. This operating condition creates a problem with these conventional type conveyor systems because of the different work times required to perform work on workpieces carried on successive load carrying units. For example, if the succeeding load carrying units are carrying workpieces requiring a lesser amount of work time than the workpieces on a preceding load carrying unit stopped at a workstation, the succeeding load carrying units will be stacked up at the entrance to the workstation waiting for the work to be performed on the workpiece on the preceding load carrying unit in the workstation. This situation creates bottlenecks in the smooth, timely flow of workpieces through the various downstream workstations along the conveyor path.

Other conveyor systems known to me include conveyors which move at a constant speed and load carrying units which are coupled and uncoupled to the conveyor for moving workpieces through workstations located along the conveyor path as work is being performed on the workpieces without stopping the load carrying units carrying the workpiece. The load carrying units are stopped, however, at a final station whereat the finished workpiece is removed from a load carrying unit and an unfinished workpiece is placed on the load carrying unit to be moved through the workstations. These conveyor systems work well wherein all of the workpieces are of the same type or otherwise require the same amount or work at each workstation along the conveyor path. However, in many manufacturing operations, a mix of different workpieces requiring different amounts of work time through each workstation are continuously moved on the same conveyor through various workstations. This situation requires a uniform spacing between all of the load carrying units with the space being determined by the maximum work time or any one of the workpieces carried by all of the load carrying units and therefore requires the use of an inordinately long conveyor and is inefficient in the use of valuable floor space in a manufacturing facility.

SUMMARY OF THE INVENTION

The present invention recognizes the drawbacks of the heretofore known conveyor systems and provides a novel solution thereto.

More particularly, the present invention provides a conveyor system comprising: a conveyor track defining a conveying path; means for moving the conveyor track; a plurality of load carrying units movable with the conveyor track; means for selectively engaging the individual load carrying units to the conveyor track for movement therewith and disengaging the individual load carrying units from the conveyor track; a first accumulation area at a predetermined location along the length of the conveying path at said first area wherein some of the load carrying units are to be accumulated into a group; means for counting the number of load carrying units in the first accumulation area; a second accumulation area at another predetermined location along the length of the conveying path spaced a distance from the iris accumulation area in which at said second area some of the load carrying units are to be accumulated into groups; means for counting the number of load carrying units in the second accumulation area; means for storing the count of the number of load carrying units in the second accumulation area; means for determining the difference between the counted number of load carrying units in the first accumulation area and in the second accumulation area; and, means operatively interconnecting the difference determining means and the pallet engaging-disengaging means to selectively engage or disengage the load carrying units to the conveyor track at the first accumulation area to the conveyor track based on the difference in the count of load carrying units in the first accumulation area and second accumulation area.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
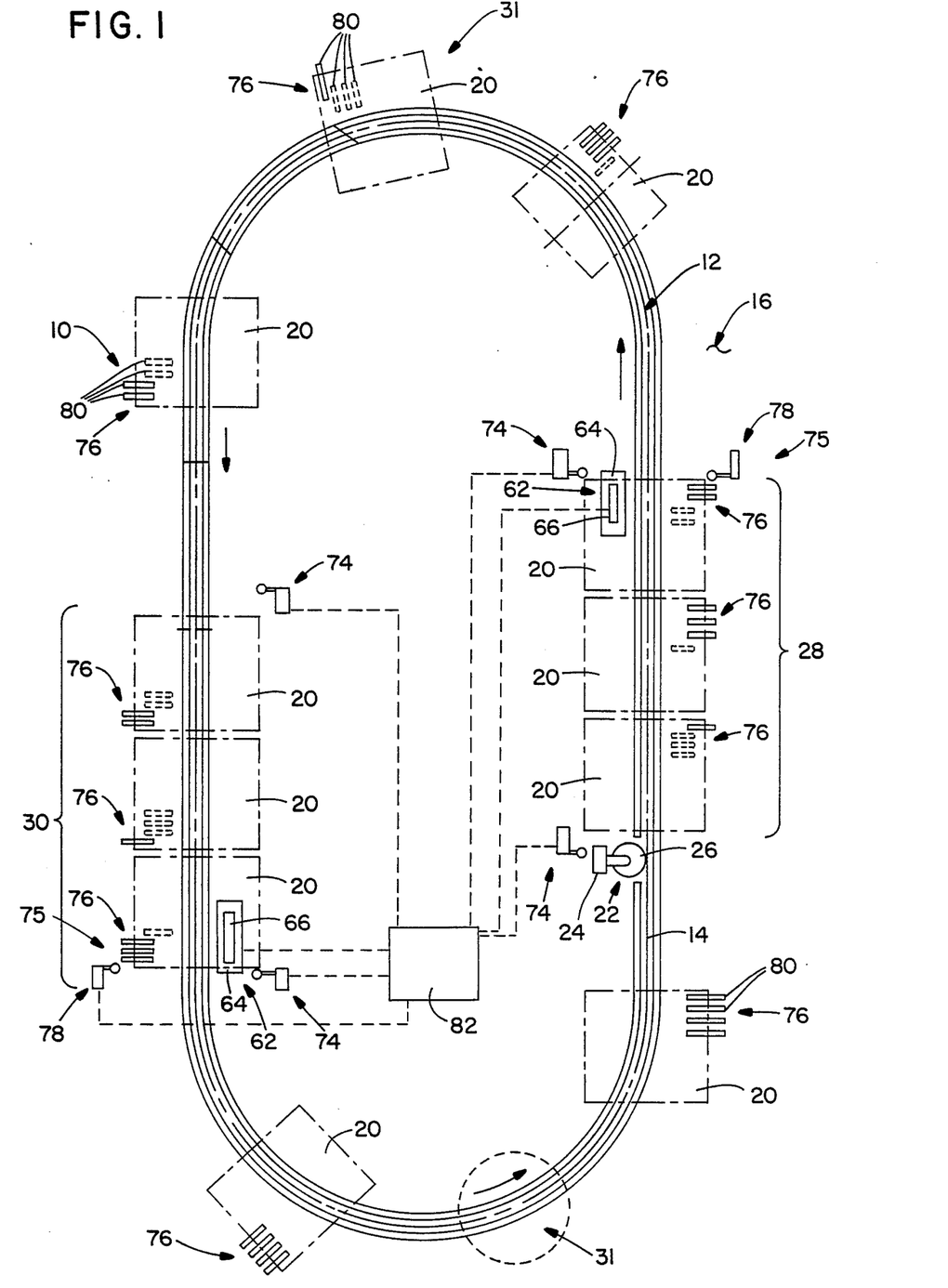
FIG. 1 is a plan view of a conveyor system of the present invention.

FIG. 1 shows a conveyor system, generally denoted as the numeral 10, incorporating features of the present invention. The conveyor system 10 includes a conveyor track 12 defining a conveying path. As shown, the conveyor track 12 is an endless chain 14 having interlocking chain links which moves along the floor 16 of a facility. Load carrying units 20 are coupled or engaged to the conveyor track 12 for movement therewith. The conveyor system 10 further includes means 22 for moving the endless conveyor track 12. Such a moving means 22 can be, for example, an electric motor 24 having a sprocket 26 attached to its output shaft with the sprocket 26 in meshing engagement with the endless chain 14 of the track. It should be clearly understood that while the conveyor track 12 Is illustrated as being located on the floor of a facility, it is contemplated that the conveyor track 12 can also be located as an overhead conveyor track or in the floor.

The conveyor system 10 is shown as including a plurality of areas at spaced apart predetermined locations along a portion of the length of the conveyor track 12 which are designated for the accumulation of at least some of the load carrying units 20 into groups. It should be understood that the conveyor system can have any number of such accumulation areas depending upon, for example, the number of workstations located along the conveyor path and the overall length of the conveyor path. It is also contemplated that in some installations having a relatively small number of workstations, only one accumulation area may be required. For the sake of discussion and brevity, there are shown two such accumulation areas denoted as a first accumulation area 28 and a second accumulation area 30. Various workstations 31 can be located along the conveyor between the accumulation areas 28 and 30.

Figure 2:
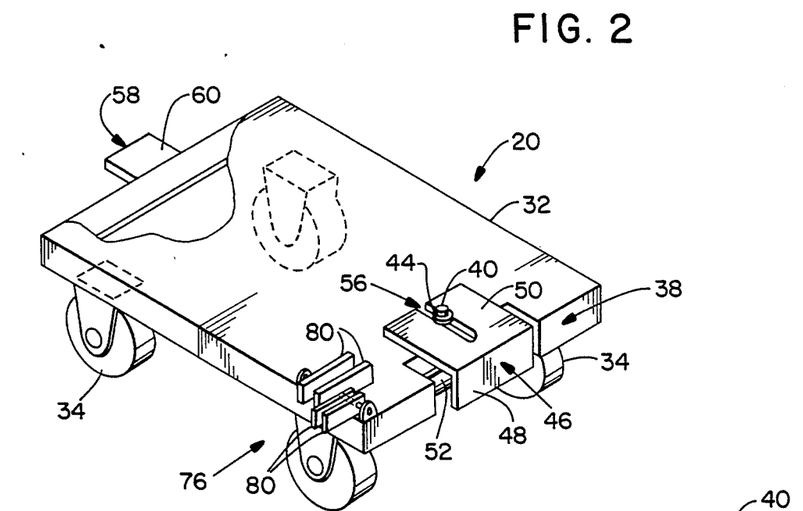
FIG. 2 is a perspective view of a load carrying unit movable with the conveyor system for carrying workpieces.
Figure 2A:
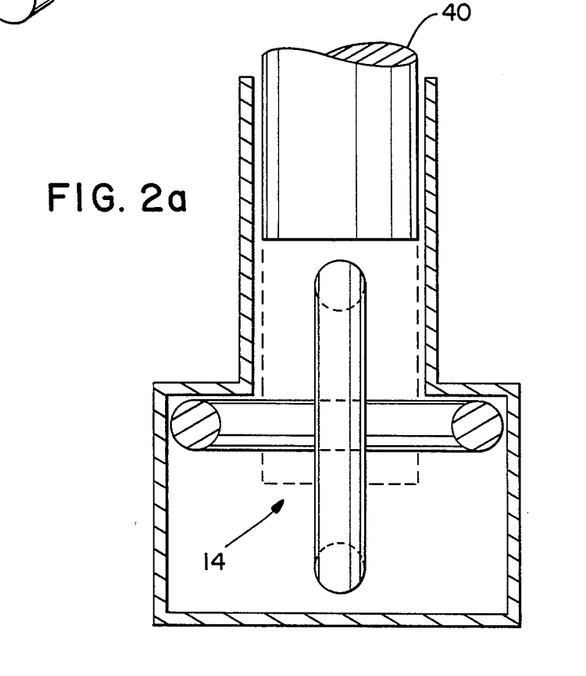
FIG. 2a is an enlarged view of an element of the load carrying unit of FIG. 2.

Now with reference to FIGS. 2 and 2a, there is shown a perspective view of one example of a load carrying unit 20 which can be used with the conveyor system 10. As shown, the load carrying unit 20 includes frame structure 32 and floor engaging wheels 34 rotatably attached to the frame structure 32. The frame structure 32 can be of virtually any construction and configuration to support a load to be carried and conveyed on the unit 20 The load carrying unit 20 further includes means generally denoted as the numeral 38 for selectively engaging and disengaging the unit 20 to and from the conveyor track 12 As shown, the conveyor track engaging-disengaging means 38 includes a depending movable conveyor chain engagement pin 40 attached to the frame 32 near the front end of the unit 20. The movable chain engagement pin 40 is movable between a lowered, conveyor chain engaged position (shown in broken lines in FIG. 2a) and a raised, vertically displaced conveyor chain disengaged position (shown in solid lines in FIG. 2a). In the lowered, conveyor chain engagement position the depending end of the pin 40 is received in the opening of one of the horizontal links of the conveyor track chain 14, and in the raised conveyor chain disengaged position the depending end of the Pin 40 is spaced a distance above and out of contact with the conveyor track chain 14 so that the conveyor track chain 14 moves beneath the depending end of the pin 40.

Figure 3:
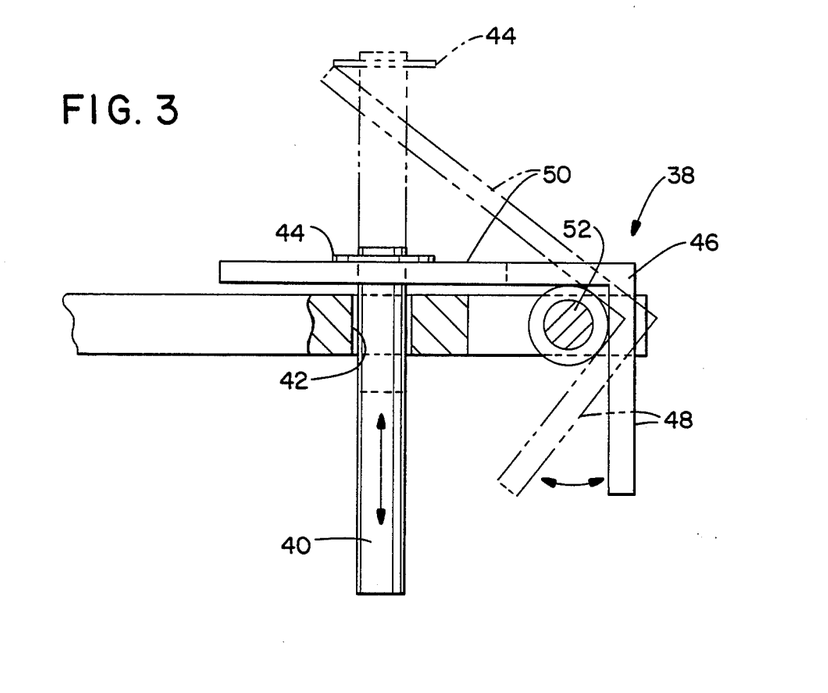
FIG. 3 is an enlarged side view of an element of the load carrying unit of FIG. 2.
Figure 4:
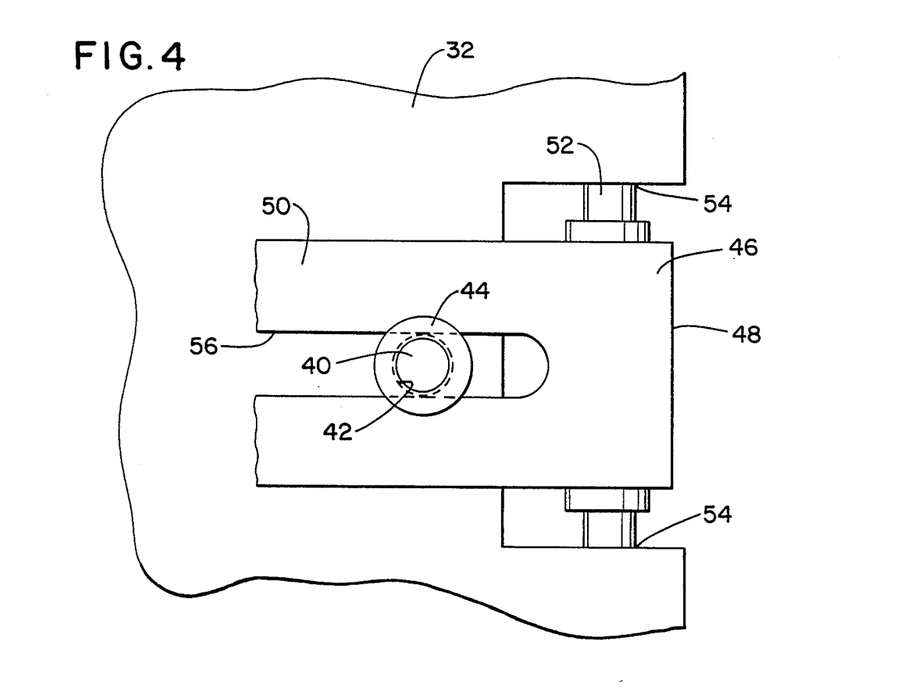
FIG. 4 is an enlarged top view of the element of FIG. 3.

Various constructions can be used to movably attach the movable pin 40 to the frame structure 32. As shown in FIGS. 2, 3 and 4, the movable pin 40 is axially, slidably received through a hole 42 in the frame 32 to depend vertically from the frame 32. A portion of the pin 40 also extends above the frame 32, and a keeper 44 is attached to the pin 40 proximate the upwardly extending end thereof. A pivotable right angled plate 46 is located at the front of the load carrying unit 20 in front of the pin 40. The angled plate 46 includes a first arm 48 and a second arm 50 at a right angle to the first arm 46. A pivot axle 52 is located across the plate 46 at the junction of the first arm 48 and second arm 50 and is affixed thereto so that the plate 46 will move with the axle 52 as it rotates. The opposite ends of the axle 52 extend beyond the opposite lateral sides of the plate 46 and are received in appropriate holes 54 in the frame 32 for rotational movement therein. The first arm 48 depends from the axle 52 at the front of the load carrying unit 20 and the second arm 50 extends back from the axle 52 to the location of the movable pin 40. The second arm 50 is formed with an elongated opening 56. The upwardly extending portion of the pin 40 is received in the elongated opening 56 with the keeper 44 located above the second arm 50 so that it is in abutment with the top side of the second arm 50. The conveyor engagement pin 40 is biased to the lowered conveyor chain engagement position by the force of gravity.

With reference to FIG. 2, the load carrying unit 20 also includes a pin moving device 58 affixed to the rear end of the unit frame 32 for moving the movable conveyor chain engaging pin 40 of a following load carrying unit 20 to the raised conveyor chain disengaged position in the event that a first or leading load carrying unit 20 has been disengaged from the conveyor track 12, and is therefore stationary, and the second or following load carrying unit 20 impacts the rear end of the first load carrying unit 20. The pin moving device 58 is shown as a generally horizontal finger 60 projecting generally horizontally rearwardly from the unit frame 32 at the elevation of the pivoted right angled plate 46. As the second or following load carrying unit 20 approaches a first or leading load carrying unit 20, which is stationary, the horizontal finger 60 projecting from the rear end of the stationary load carrying unit 20 contacts the depending arm 48 of the plate 46 of the second or following load carrying unit 20, thusly, lifting the movable conveyor chain engaging pin 40 of the second or following load carrying unit 20 to the vertically displaced conveyor track disengaged position thereby also disengaging the second load carrying unit 20 from the moving conveyor track 12 so that it will also stop.

Figure 5:
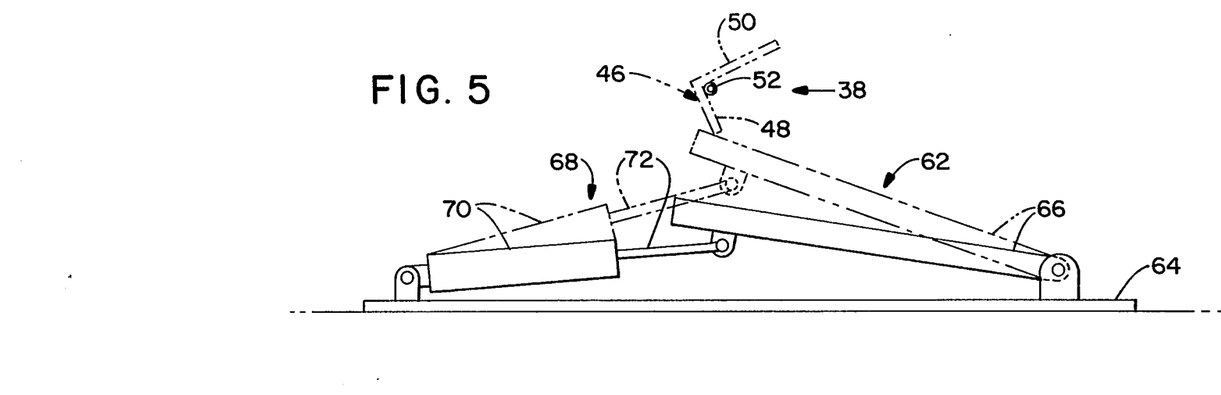
FIG. 5 is an enlarged side view of a component of the conveyor system.
Figure 6:
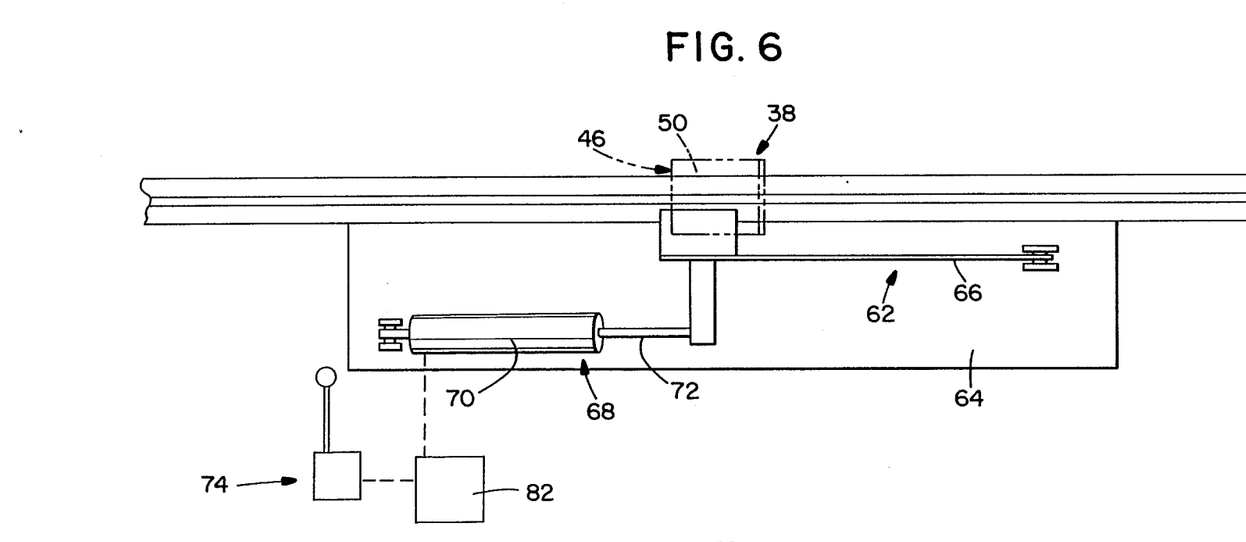
FIG. 6 is an enlarged side view of the component of FIG. 5.

Now with reference to FIGS. 1, 5 and 6, activating means 62 are located proximate the downstream end of each accumulation area 28 and 30 for selectively activating the load carrying unit engaging-disengaging means 38 of the load carrying unit 20 at the downstream end of the accumulation areas 28 and 30 between conveyor track engaged and disengaged positions to control or selectively stop the load carrying unit 20 from moving with the conveyor track 12 and allow the load carrying unit 20 to move with the conveyor track 12.

The activating means 62 is located next to the conveyor track 12 at the downstream end of the accumulation areas 28, 30. The plate actuator 62 is shown as including a base 64 on the floor !6 next to the conveyor track 12, a movable arm 66 attached to the base 64, and an arm actuator 68. The movable arm 66 is pivotably attached at one of its ends to the base 64 for pivotable movement in a vertical plane parallel to the conveyor track 12 section adjacent thereto. The arm actuator 68 is shown as a fluid operated cylinder device having its piston cylinder 70 pivotably mounted to the base 64 and the distal end of its operating rod 72 pivotably attached to the movable arm 66 between the pivoted end and free end of the movable arm 66. The fluid operated cylinder device 70 can be selectively operated to retract its operating rod 72 to pivot the movable arm 66 to a lowered position beneath the depending end of the first arm 48 of the angled plate 46 of the engaging-disengaging means 38 so it will not contact the right angled plate 46, and to extend its operating rod 72 to pivot the movable arm 66 to a raised position projecting above the elevation of the depending end of the first arm 48 of the angled plate 46 of the engaging-disengaging means 38 so it will contact the right angled plate 46. When the movable arm 66 is in the raised position (shown in broken lines in FIG. 5) it contacts the depending first arm 48 of the right angled plate 46 causing the plate 46 to pivot on the axle 52. The second arm 50 is thusly moved upwardly in an accurate motion centered on the axle 52 raising or lifting the pin 40, by the keeper 44, to the vertically displaced conveyor chain disengaged position as shown in broken lines in FIG. 3. When the movable arm 66 is in the lowered position (shown in solid lines in FIG. 5) it does not contact the depending first arm 48 of the right angled plate 46 thus allowing the pin 40 to remain in or drop vertically back to the lowered conveyor chain engaged position as shown in solid lines in FIG. 3.

With reference to FIGS. 1 and 6, load carrying unit counting means, generally denoted as the numeral 74, are located at each of the load carrying unit accumulation areas 28 and 30 for counting the number of load carrying units 20 in each of the accumulation areas 28 and 30 at any given time during the operation of the conveyor system 10. As shown in FIG. 1, the load carrying unit counting means 74 is located at the upstream end of each of the accumulation areas 28 and 30 for counting the number of load carrying units 20 entering each of the accumulation areas 28 and 30, and another counting means 74 is located at the downstream end of each of the accumulation areas 28 and 30 for counting the number of load carrying units 20 leaving each of the accumulation areas 28 and 30. Various devices can be used as a counting means 74. The counting device 74 can be, for example, a photocell device having its light beam directed transversely across the conveyor track 12, or as shown, it can be a limit switch located at a fixed position next to the path of the conveyor track 12 so that a load carrying unit 20 will trip or contact it as the unit 20 moves therepast.

Now once again with reference to FIGS. 1 and Z, the conveyor system 10 further includes timer means 75 for selecting the time interval between the release of successive load carrying units 20 from the accumulation areas 28 and 30. Toward this objective, the timer means includes time specifying means 76 associated with each load carrying unit 20 for specifying the time between the release of the downstream one of the load carrying units 20 in an accumulation area 28, 30 and the release of the next succeeding one of the load carrying units 20 in the same accumulation area 28, 30 and reading means 78 located next to the conveyor track 12 proximate the downstream end of the accumulation area 28, 30 for reading the time specifying means 76 of each of the load carrying units 20 as each of the load carrying units 20 moves with the conveyor track 12 out of the accumulation area 28, 30 past the reading means 78. The time specifying means 76 and reading means 78 can be virtually any one of a number of devices. For example, the time specifying means 76 could be a label having a bar-code printed thereon and affixed to the load carrying unit 20, and the reading means 78 would then be a bar-code reader device or other electrical information devices. As shown, the time specifying means 76 comprises a series of spaced apart flags 80 attached to the top side of the load carrying unit frame structure 32.

Each of the flags 80 are pivotably attached at one of their ends to the load carrying unit frame structure 32 so that they can individually and selectively be pivoted between an inoperative position shown in phantom lines in FIGS. 1 and 2 and an operative position shown in solid lines in FIGS. 1 and 2. The space between adjacent flags corresponds to a time period, for example, 30 seconds. The reading means 78 is shown as a contact switch located at a fixed position next to the conveyor track 12 located to contact only those flags 80 on the downstream one of the load carrying unit 20 which are in the operative position as that downstream one of the load carrying units 20 moves out of the accumulation area 28, 38 with the moving conveyor track 12 past the reading means 78.

With continued reference to FIG. 1, the counting means 74 is operatively interconnected to the activating means 62 through calculating means, generally denoted as the numeral 82. The calculating means 82 is operatively associated with the counting means 74 at the first and second accumulation areas 28 and 30 for receiving and storing a signal from the counting means corresponding to the count of the number of load carrying units 20 leaving and entering the accumulation areas 28 and 30, and also for determining the difference between the counted number of load carrying units 20 in successive accumulation areas 28 and 30. The calculating means 82 can be, for example, a computer such as a micro-processor or the like. The difference in the number of load carrying units 20 in successive accumulation areas 28 and 30 is determined by calculating the difference between the counted number of load carrying units 20 leaving the first accumulation area 28 and the counted number of load carrying units 20 entering the second accumulation area 30 The difference between the number of load carrying units 20 in the first and second accumulation areas 28 and 30 provides the number of load carrying units 20 on the conveyor track 12 between the successive first and second accumulation areas 28 and 30. The calculating means 82 is operatively associated with the activating means 62 to selectively operate the load carrying unit to engaging-disengaging means 38 as discussed above to selectively couple and uncouple the downstream one of the load carrying units 20 in the accumulation areas 28 and 30 to the conveyor track 12 based upon the difference in the count of load carrying units 20 in successive accumulation areas 28 and 30 entirely providing for the maintenance of a preselected number of load carrying units 20 on the conveyor track 12 between successive accumulation areas 28 and 30.

The reading means 78 is also operatively interconnected to the activating means 62 through the calculating means 82. The calculator means 62 receives and stores a signal from the reading means 78 as a load carrying unit 20 at the downstream end of the accumulation areas 28, 30 is coupled to the track 12 and moves out of the accumulation area 28, 30 corresponding to the predetermined time interval for release of the next succeeding load carrying unit from the accumulation area 28, 30. After the expiration of the predetermined time interval, the calculating means 82 activates the load carrying unit engaging-disengaging means 38 to couple the next succeeding load carrying unit to the conveyor track 12 for movement out of the accumulation area 28, 30 thereby providing for the maintenance of a preselected distance between succeeding load carrying units moving with the conveyor track 12 between adjacent accumulation areas 28, 30.

In operation of the conveyor system, the load carrying units 20 will enter and leave the accumulation areas 28 and 30, thereby continuously accumulating load carrying units 20 in the accumulation areas 28 and 30. As the load carrying units 20 enter an accumulation area 28, 30, the counting means 74 is activated so as to count that load carrying unit 20. The load carrying unit 20 will move with the conveyor track 12 into the accumulation area and if it is the first load carrying unit to enter the accumulation area, it will be stopped at the downstream end of the accumulation area by the activating means 62. Successive load carrying units 20 moving into the accumulation area will each be stopped in turn when it approaches the preceding stopped load carrying unit 20 and its conveyor track engaging-disengaging means 38 contacts the pin moving means 58 of the preceding stopped load carrying unit. Thusly, the count of the number of load carrying units 20 in the accumulation areas is recorded and stored by the calculating means 82. The calculating means 82 then compares the count of the load carrying units in the accumulation areas against the total number of load carrying units 20 moving on the conveyor track 12 and, thereby, determines the number of load carrying units 20 moving between the accumulation areas 28, 30. If the number of load carrying units 20 moving on the conveyor track 12 between accumulation areas is less than a predetermined number stored in the calculating means, the calculating means 82 activates the activating means 62 at the downstream one of the accumulation areas to release therefrom the appropriate number of load carrying units 20 to make up for the deficiency in the number of load carrying units 20 moving with the conveyor track 12 between accumulation areas. Likewise, if the number of load carrying units 20 moving on the conveyor track 12 between accumulation areas is greater than a predetermined number the calculating means 82 deactivates the activating means 62 of the downstream one of the accumulation areas so as not to release further load carrying units 20 therefrom until the excess number of load carrying units 20 has moved into the upstream one of the accumulation areas.

In addition, as the load carrying units 20 are continuously accumulated in the accumulation areas 28, 30, the time interval corresponding to the space between adjacent load carrying units moving with the conveyor track 12 between accumulation areas is determined. This determination is based upon the work time required at a workstation between the accumulation areas for work to be done on the workpieces to be carried by each load carrying unit 20. It should be noted at this point that the workpieces can be loaded onto and unloaded from the load carrying units 20 in the accumulation areas. The predetermined time between the release of a preceding load carrying unit 20 and a succeeding load carrying unit 20 from an accumulation area is then set on the time specifying means 76 on succeeding load carrying units 20. The time interval set on the time specifying means 76 of a succeeding load carrying unit corresponds to the work time required at the workstation on the workpiece on the preceding load carrying unit. After the predetermined time has elapsed from the coupling of a preceding load carrying unit 20 to the conveyor track 12, the calculating means 82 activates the engaging-disengaging means 38 of the next succeeding load carrying unit to couple the next succeeding load carrying unit to the conveyor track 12.

The foregoing description is given primarily for clearness of understanding and no unnecessary limitations are to be understood therefrom for modifications will become obvious to those skilled in the art upon reading this disclosure and may be made without departing from the spirit of the invention or scope of the appended claims.

What is claimed:

1. A conveyor system comprising:
   an endless conveyor track defining an endless conveying path;
   means for moving the conveyor track;
   a predetermined fixed number of load carrying units movable with the conveyor track;
   a first accumulation area as a predetermined location along the length of the conveying path at said first area wherein some of the load carrying units are to be accumulated into a group;
   means for counting the number of load carrying units in the first accumulation area;
   a second accumulation area at another predetermined location along the length of the conveying path spaced a distance from the first accumulation area in which at said second area some of the load carrying units are to be accumulated into a group;
   means for counting the number of load carrying units in the second accumulation area;
   calculating means for storing the count of the number of load carrying units in the first and second accumulation areas;
   means for selectively engaging the load carrying units to the conveyor track for movement therewith and disengaging the individual load carrying units from the conveyor track at said first and said second accumulation areas:
   said calculating means determining the total number of the load carrying units in the accumulation areas and determining the total number of load carrying units moving on the conveyor track, and thereby, determining the number of load carrying units moving between said accumulation areas;
   means operatively interconnecting said calculating means and the engaging-disengaging means to selectively disengage the load carrying units from the conveyor track at one of the first and the second accumulation areas when the number of load carrying units moving with the conveyor track between the accumulation areas is greater than a predetermined number stored in the calculating means; and
   said engaging-disengaging means engaging the load carrying units to the conveyor track at one of the first and the second accumulation areas when the number of load carrying units moving with the conveyor track between the accumulation areas is less than said predetermined number stored in the calculating means.

2. A conveyor system comprising:
   a conveyor track defining a conveyor path;
   means for moving the conveyor track;
   a plurality of load carrying units movable with the conveyor track;
   means associated with each load carrying unit for selectively engaging and disengaging the load carrying unit to the conveyor track;
   a first accumulation area at a predetermined location along the length of the conveying path in which at said first area some of the load carrying units are to be accumulated into a group;

means at the downstream end of the first accumulation area for selectively activating the engaging-disengaging means of a load carrying unit at the downstream end of the first accumulation area between the conveyor track engaged and disengaged positions;

counting means at the downstream end of the first accumulation area for counting the load carrying units leaving the first accumulation area;

means for storing the count of the number of load carrying units leaving the first accumulation area;

a second accumulation area at another predetermined location along the length of the conveying path spaced a distance from the first accumulation area in which at said second area some of the load carrying units are accumulated into a group;

counting means at the upstream end of the second accumulation area for counting the load carrying units entering the second accumulation area;

means for storing the count of the number of load carrying units entering the second accumulation area;

means for determining the difference between the counted number of load carrying units leaving the first accumulation area and entering the second accumulation area; and, means operatively interconnecting the difference determining means and the activating means at the downstream end of the first accumulation area to selectively engage or disengage the load carrying unit at the downstream end of the first accumulation area to the conveyor track based upon the difference in the count of load carrying units leaving the first accumulation area and entering the second accumulation area.

3. The conveyor system of claim 2, further comprising:

counting means at the upstream end of the first accumulation area for counting the load carrying units entering the first accumulation area;

means for storing the count of the number of load carrying units entering the first accumulation area;

counting means at the downstream end of the second accumulation area for counting the load carrying units leaving the second accumulation area; and, means for storing the count of the number of load carrying units leaving the second accumulation area.

4. A conveyor system comprising:

a conveyor track defining a conveyor path;

means for moving the conveyor track;

a plurality of load carrying units for movement with the conveyor track;

means associated with each load carrying unit for selectively engaging and disengaging the individual load carrying units to the conveyor track;

a first accumulation area at a predetermined location along a portion of the length of the conveyor path in which first accumulation area at least some of the load carrying units are accumulated into a group;

means at the downstream end of the first accumulation area for selectively activating the engaging-disengaging means of a load carrying unit at the downstream end of the first accumulation area between conveyor track engaged and disengaged dispositions;

means associated with each load carrying unit for specifying the time interval between the engagement of the downstream one of the load carrying units in the first accumulation area to the conveyor track and the engagement of the next succeeding one of the load carrying units in the first accumulation area to the conveyor track; and, means at the accumulation area for reading the time interval specifying means of each of the load carrying units as each load carrying unit successively moves with the conveyor track out of the first accumulation area, the reading means being operatively associated with the activating means to activate the engaging-disengaging means of the next succeeding load carrying unit in the first accumulation area after the time interval specified by the time specifying means of the preceding load carrying unit has expired to engage the next succeeding load carrying unit to the conveyor track.

5. The conveyor system of claim 4, further comprising:

A second accumulation area at a predetermined location along a portion of the length of the conveyor path in which second accumulation area at least some of the load carrying units are accumulated into a group;

means at the downstream end of the second accumulation area for selectively activating the engaging-disengaging means of a load carrying unit at the downstream end of the first accumulation area between conveyor track engaged and disengaged dispositions; and, means at the second accumulation area for reading the time interval specifying means of each of the load carrying units as each load carrying unit successively moves with the conveyor track out of the second accumulation area the reading means being operatively associated with the activating means to activate the engaging-disengaging means of the next succeeding load carrying unit in the second accumulation area aiter the time interval specified by the time specifying means of the preceding load carrying unit has expired to engage the next succeeding load carrying unit to the conveyor track.

6. A method for controlling the space between adjacent load carrying units moving with a continuously moving conveyor track comprising the steps of:

continuously accumulating some of the load carrying units in a first accumulation area along the length of the conveyor track;

determining the time interval corresponding to the space between a first load carrying unit and its immediate upstream load carrying unit and storing said time interval in calculating means, said time interval determining the release time for sad immediate upstream load carrying units;

coupling each successive load carrying unit in the first accumulation area to the moving conveyor track after the determined time interval from the coupling of the preceding one of the load carrying units in the first accumulation area to the conveyor track once the time interval has lapsed;

accumulating the load carrying units moving from the first accumulation area in a second accumulation area along the length of the conveyor track spaced downstream of the first accumulation area relative to the direction of movement of the conveyor track.

7. A method for controlling the number of load carrying units moving with a continuously moving conveyor track comprising the step of continuously accumulating load carrying units in a first accumulation area along the length of the conveyor track;
   counting the number of load carrying units in the first accumulation area at any time;
   continuously accumulating load carrying units in a second accumulation area along the length of the conveyor track spaced a distance downstream of the first accumulation area relative the direction of movement of the conveyor track;
   counting the number of load carrying units accumulated in the second accumulation area at the same time as the count is made of the number of load carrying units accumulated in the first accumulation area;
   comparing the count of the number of load carrying units accumulated in the iris accumulation area and the number of load carrying units accumulated in the second accumulation area to determine any difference between the counts;
   comparing the difference in the count of load carrying units in the first and second accumulation areas against a predetermined number of load carrying units to be maintained in movement with the conveyor track between the first and second accumulation areas; and,
   selectively coupling load carrying units to or uncoupling load carrying units from the continuously moving conveyor track at the first accumulation area based upon whether the deviation of the difference in the count of load carrying units in the first and second accumulation areas is less than or more than the predetermined number of load carrying units to be moving with the conveyor track between the first and second accumulation areas.

* * * * *